United States Patent
Olson

(10) Patent No.: US 7,444,810 B2
(45) Date of Patent: Nov. 4, 2008

(54) LEVER OPERATED PIVOTING FLOAT WITH GENERATOR

(75) Inventor: Chris Olson, Houston, TX (US)

(73) Assignee: Olson Enterprises, Inc, Houston, TX (US)

( * ) Notice: Subject to any disclaimer, the term of this patent is extended or adjusted under 35 U.S.C. 154(b) by 0 days.

(21) Appl. No.: 11/799,930

(22) Filed: May 2, 2007

(65) Prior Publication Data

US 2008/0169653 A1 Jul. 17, 2008

Related U.S. Application Data

(60) Provisional application No. 60/904,749, filed on Mar. 2, 2007, provisional application No. 60/880,321, filed on Jan. 12, 2007.

(51) Int. Cl.
*F03C 1/00* (2006.01)
(52) U.S. Cl. ............... 60/495; 60/497; 60/498; 60/500; 290/42; 290/53
(58) Field of Classification Search ........... 60/495–496, 60/497, 498, 500; 290/42, 53
See application file for complete search history.

(56) References Cited

U.S. PATENT DOCUMENTS

| | | |
|---|---|---|
| 1,385,083 A | 7/1921 | McCulley |
| 3,928,967 A | 12/1975 | Salter |
| 4,210,821 A * | 7/1980 | Cockerell ............... 290/53 |
| 4,319,454 A | 3/1982 | Lucia |
| 4,379,235 A * | 4/1983 | Trepl, II ............... 290/53 |
| 4,408,455 A | 10/1983 | Montgomery |
| 4,568,836 A | 2/1986 | Reenberg |
| 4,718,231 A | 1/1988 | Vides |
| 5,405,250 A | 4/1995 | Vowles et al. |
| 5,808,368 A | 9/1998 | Brown |
| 5,929,531 A * | 7/1999 | Lagno ............... 290/53 |
| 6,020,653 A * | 2/2000 | Woodbridge et al. ......... 290/53 |
| 7,076,949 B2 * | 7/2006 | Fernandez Gomez et al. . 60/498 |

* cited by examiner

*Primary Examiner*—Hoang M Nguyen
(74) *Attorney, Agent, or Firm*—David McEwing

(57) ABSTRACT

A device comprising a pivoting float and lever arm combination attached to a beam such that the float and lever arm can unfold and change orientation to the ocean surface. The float and lever arm pivot and the float can be rotated to a vertical position relative to the water surface. The lever arm can, for example, be attached to a suspended beam or to the ocean bottom. A method for moving a float and a lever arm in response to ocean wave action comprising pivotally attaching a first end of a lever arm to a float; attaching a second end of the lever arm to a connector component; and attaching an end of the connector component to the ocean floor.

10 Claims, 6 Drawing Sheets

LEVER OPERATED PIVOTING FLOAT WITH GENERATOR

RELATED APPLICATIONS

This application claims the benefit of and priority to provisional application 60/880,321 entitled "Lever Operated Pivoting Float with Generator" filed Jan. 12, 2007. The application also claims the benefit of and priority to provisional application 60/904,749 entitled "Lever Operated Pivoting Float with Generator" filed Mar. 2, 2007. Both applications 60/880,321 and 60/904,749 are incorporated herein by reference.

This application incorporates by reference herein non-provisional application Ser. No. 11/473,357 filed Jun. 22, 2006 and entitled "Ocean Wave Energy Converter", non-provisional application Ser. No. 11/513,805 filed Aug. 31, 2006 and entitled "Air Pump For Float", and non-provisional application Ser. No. 11/513,770 filed Aug. 31, 2006 and entitled "Non Rigid Inflatable Gas Storage Apparatus".

BACKGROUND OF THE INVENTION

1. Field of Use

The device transforms energy from ocean wave motion into differing forms of energy. The device includes a pivoting float attached to a lever arm. The pivoting floating and the attached lever arm can unfold in relation to the other and the orientation of the float can change from horizontal to vertical relative to the ocean surface.

2. Description of Related Art

There are numerous floatation mechanism. However none of these devices are known to have been commercially or technically successful.

SUMMARY OF INVENTION

A device comprising a pivoting float and lever arm combination attached to a stable submerged object such that the float and lever arm can unfold and change orientation to the ocean surface. The float and lever arm pivot and the float can be rotated to a vertical position relative to the water surface. The lever arm can, for example, be attached to a suspended beam or to the ocean bottom.

A method for moving a float and a lever arm in response to wave action comprising pivotally attaching a first end of a lever arm to a float; attaching a second end of the lever arm to a connector component; and attaching an end of the connector component to the ocean floor.

SUMMARY OF DRAWINGS

FIG. 6 illustrates the lever arm in a downward orientation and attached by a connecting component to the ocean floor.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DESCRIPTION OF INVENTION

The device subject of this disclosure pertains to a buoyant and pivoting float that has a vertical component of motion from the peaks and valleys of waves on the ocean surface. Typically, the pivoting float is at a horizontal position relative to the ocean surface, i.e., the longitudinal axis of the float being horizontal to the ocean surface. In one embodiment, the lever arm is pivotally attached at the pivoting float at a rotating shaft. The lever arm typically points skyward or at an acute upward angle to the horizontally oriented float. See the position of the lever arm 52 illustrated in FIG. 1.

Figure 2:
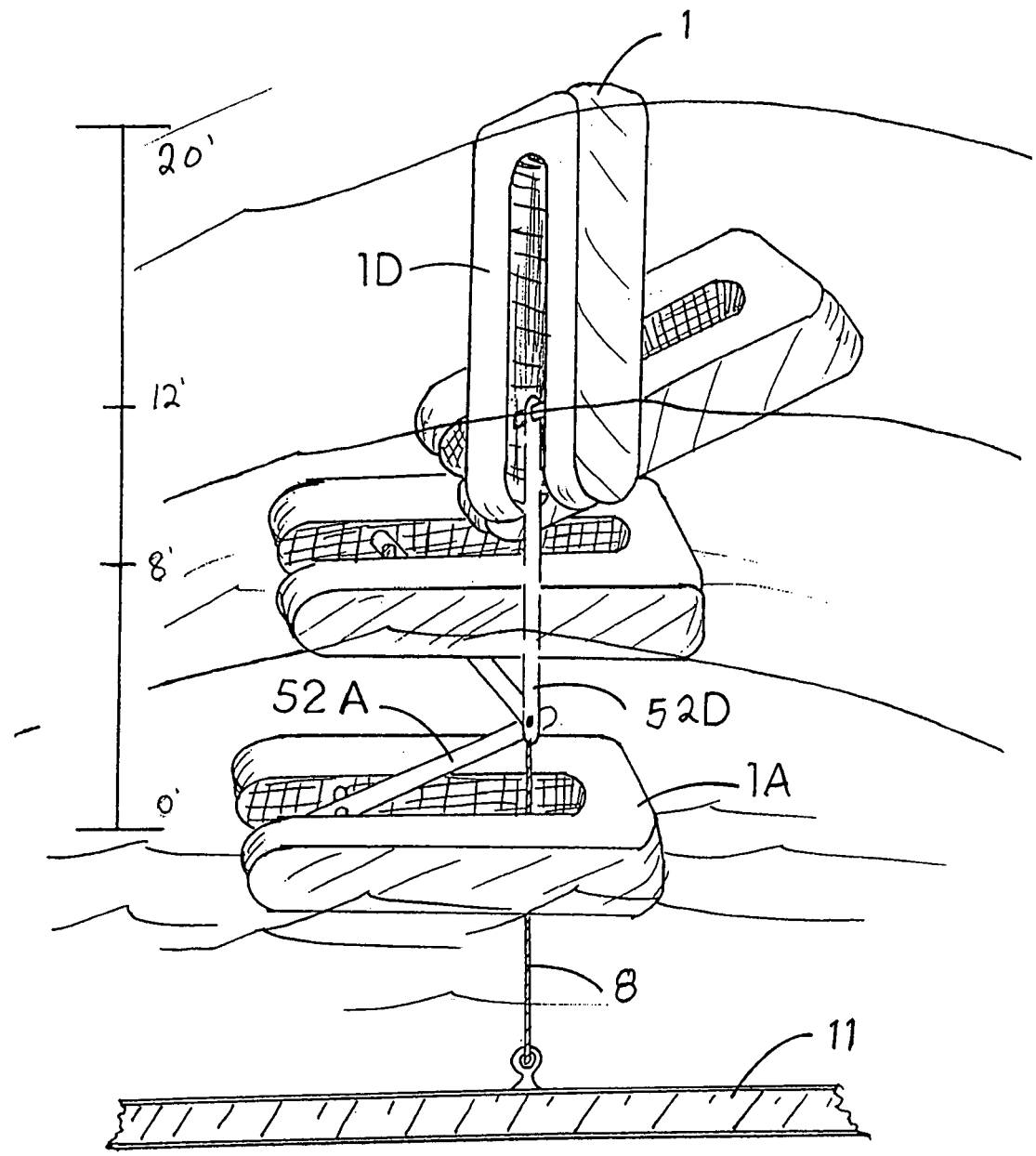
FIG. 2 is a composite drawing of the several positions of the pivoting float and lever arm. The pivoting float moves from a horizontal position to a vertical position. The lever arm moves from an upward orientation to a downward orientation and ultimately a vertical orientation pointing downward into the water. The attachment of the device to a beam via a cable is also illustrated.

In the embodiment illustrated by the drawings, the pivoting float can rotate 90° from horizontal to vertical relative to the ocean surface. When in the vertical position, the float can be more easily submerged (duck dive) with less force. This 90° rotation, combined with the diving or submersion of the rotated float, protects components from large ocean waves. This is illustrated in FIG. 2.

In one embodiment, multiple floats of the invention are utilized. The floats are attached to and support a rigid heavy beam beneath the ocean surface. A beam is submerged beneath the ocean surface and suspended by the combined buoyancy of floats. A plurality of beams can be combined into a grid. Due to the number of separate floats utilized, some floats are experiencing a wave peak and other floats are experiencing wave troughs. The suspended beam, submerged beneath the ocean surface, therefore resides in a stable plane. The beam (or grid) constitutes a submerged stable object.

At least one float holds additional components. In one example, these components include one or more electrical generators, pumps, gears, ratchet and pawl, rotating shaft connecting the lever arm to the float, a spring, counter weights and attachment mechanism connecting one end of the lever arm to the submerged beam. The rotating shaft may turn with movement of the pivoting float or lever arm. The rotation of the shaft may supply mechanical power (energy).

The electrical generators can be AC or DC. The gears step up the rotation of the generator shaft in response to the energy source (movement of the lever arm as a result of vertical movement of the float). Stated differently, if the arm rotates the first gear wheel 90°, the generator shaft may be rotated 360° 25 times. (A ratio of 1:100). Other gear ratios are possible.

In another example of additional components, a ratchet and pawl component is to permit the generator shaft to turn in only one direction. The lever arm will be moving up and down in response to wave action. Due to the action of the ratchet and pawl, this back and forth motion does not rotate the generator shaft in 2 directions. The generator shaft spins in a single direction.

There is a rotating shaft extending from the gear component attached to the generator. The shaft is fixed to the first end of the lever arm. The shaft may extend to a second generator. It will be appreciated that when one generator is "decoupled" from the power source by the ratchet pawl combination, the other generator will be turning.

Figure 1:
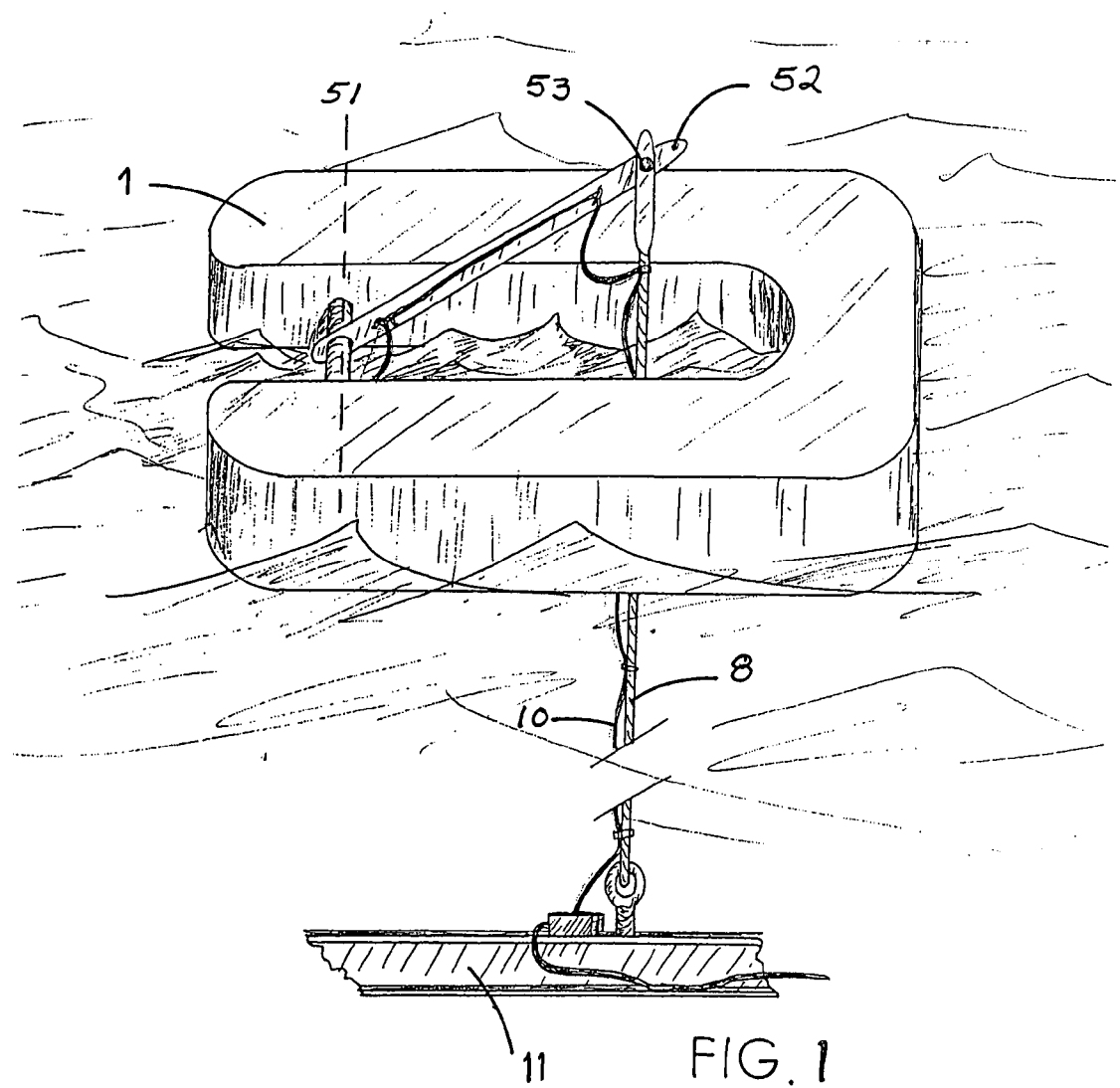
FIG. 1 illustrates the pivoting float oriented horizontal to the ocean surface with the open middle section and end. Also shown is the lever arm mounted to the rotating shaft and pointing skyward or at an acute angle to the ocean surface. Also shown is a cable attaching an end of the lever arm to a beam (or grid) and an electrical cable.
Figure 4:
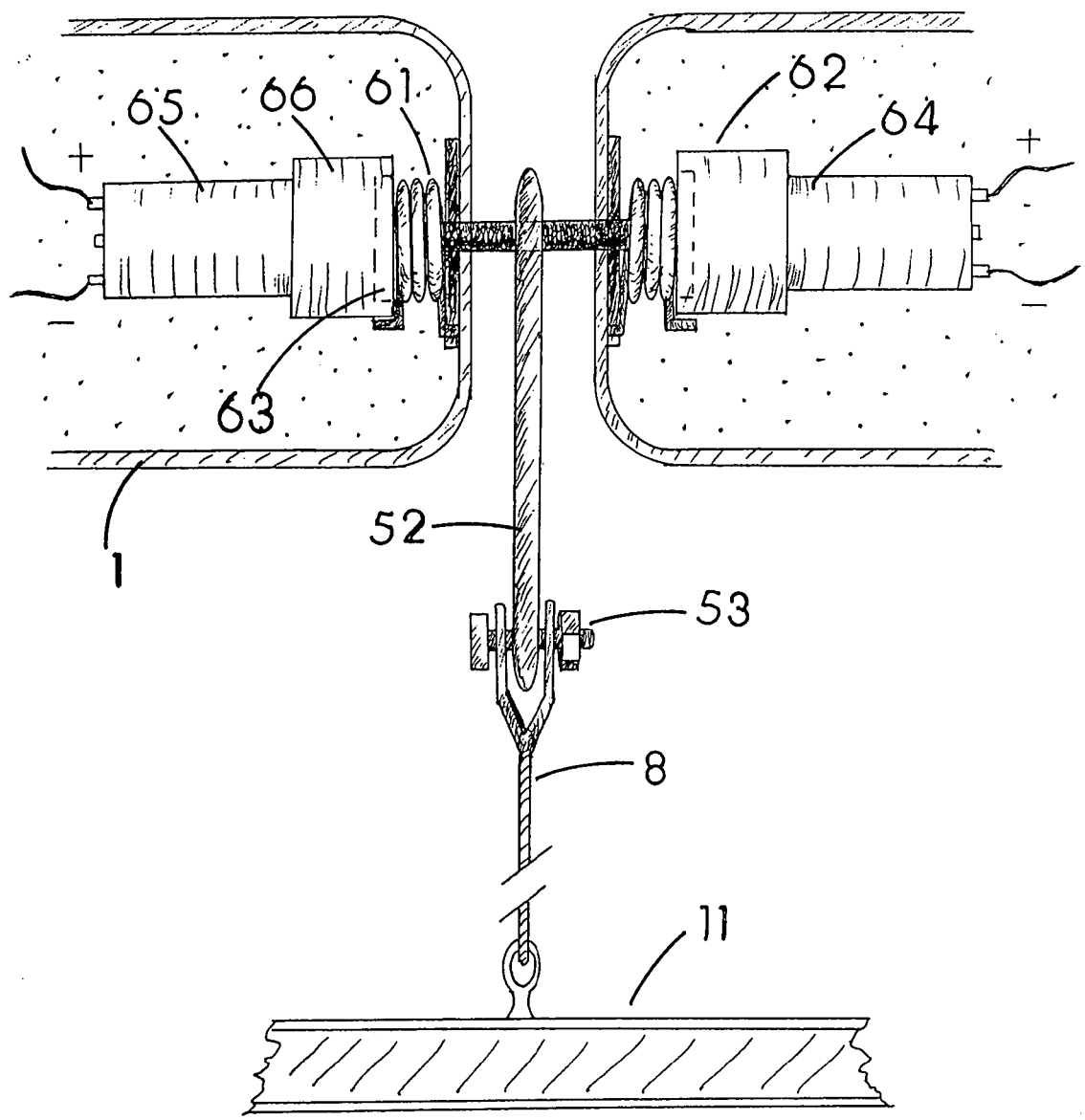
FIG. 4 illustrates a detailed cross sectional view of the of the pivoting float, internal machinery, the rotating shaft, lever arm and connector component such as a cable, rod, chain or rope, connected to a beam or portion of a larger grid.

There is also a spring component that returns the lever arm to a predetermined position. This return motion can be supplemented with counterweights FIG. 1 shows one example of a pivoting float 1 of the invention. The float has a center opening and open end ("U shaped"). Also shown is the rotating shaft 51 that maybe connected to one or more generators (not shown) installed within the body of the pivoting float. The shaft is connected to a lever arm 52 that is pivotally attached to the float and attached 53 to a connecting component such as a cable or rod 8 fixed to the beam 11. Also illustrated is an electrical cable 10 that may convey the electrical power created by the generator. The generator may be located within the float as illustrated in FIG. 4. In another embodiment, the generator or other work device, e.g., a pump, is located on the float. In another embodiment, the work device, e.g., generator, pump, etc., may be located on or within the lever arm.

FIG. 2 illustrates the movement of the pivoting float from the horizontal position 1A to the vertical position 1D (duck down) in response to a large wave. Note the pivoting relationship between the float 1 and the lever arm 52. The lever arm and float unfold (1A & 52A) and become vertically aligned (1D & 52D) due to the action of the waves. Note the length of the connective component 8 is illustrated to be constant and the submerged structure remains in a stable position.

Figure 3:
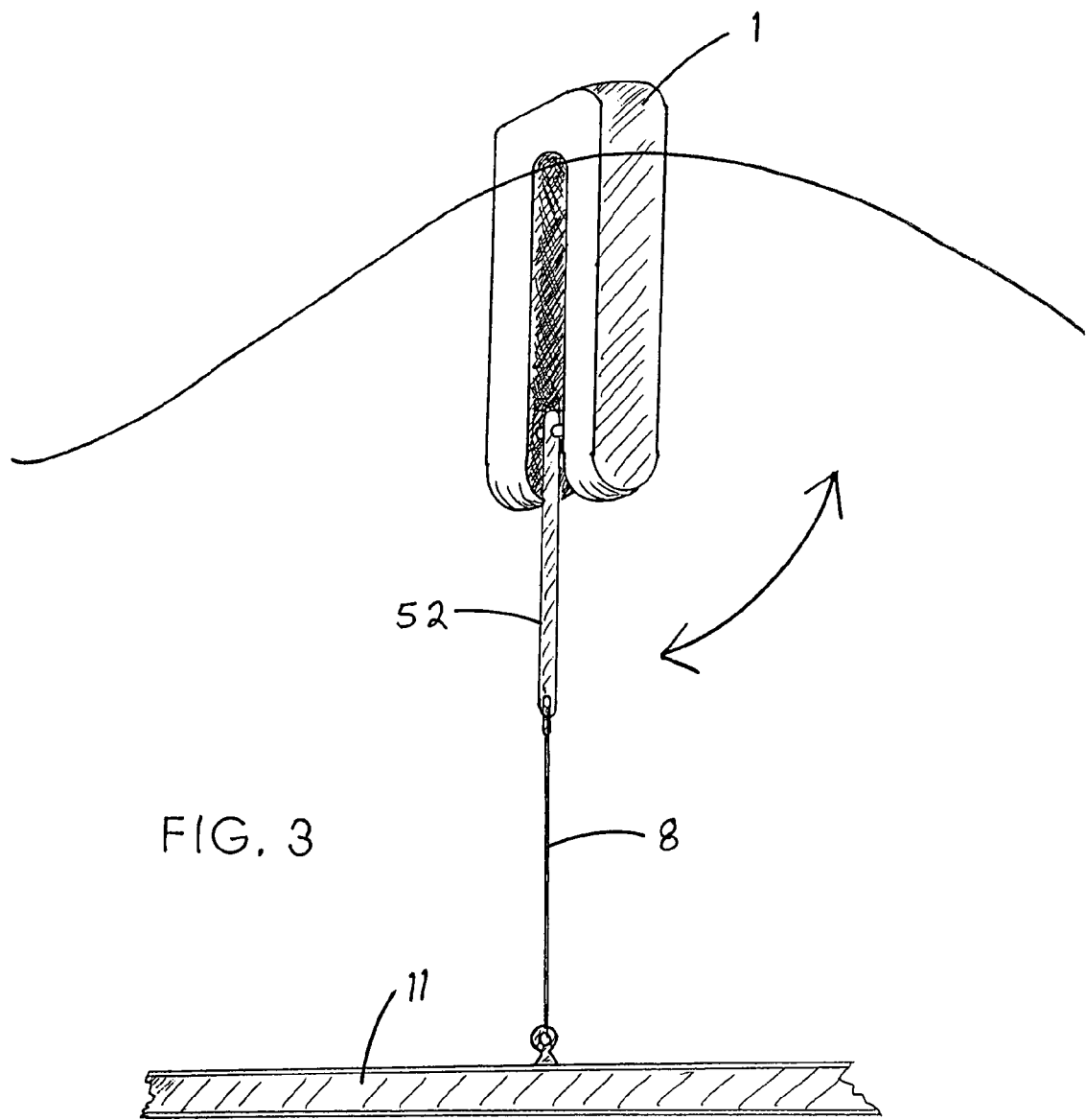
FIG. 3 illustrates the pivoting float and lever arm in a vertical position. Also attached is a cable connecting the lever arm to a beam.
Figure 5:
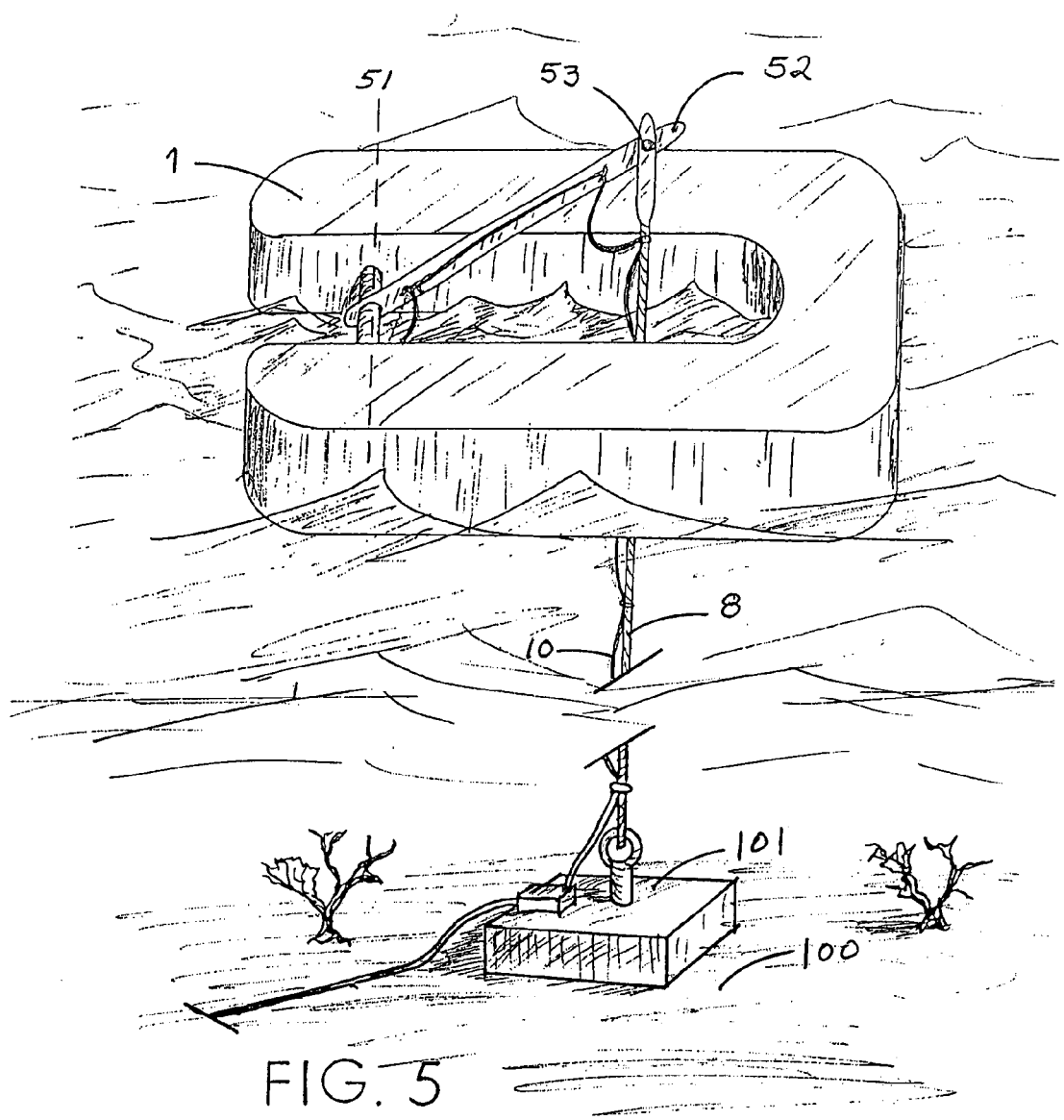
FIG. 5 illustrates the cable attached to the ocean floor.
Figure 6:
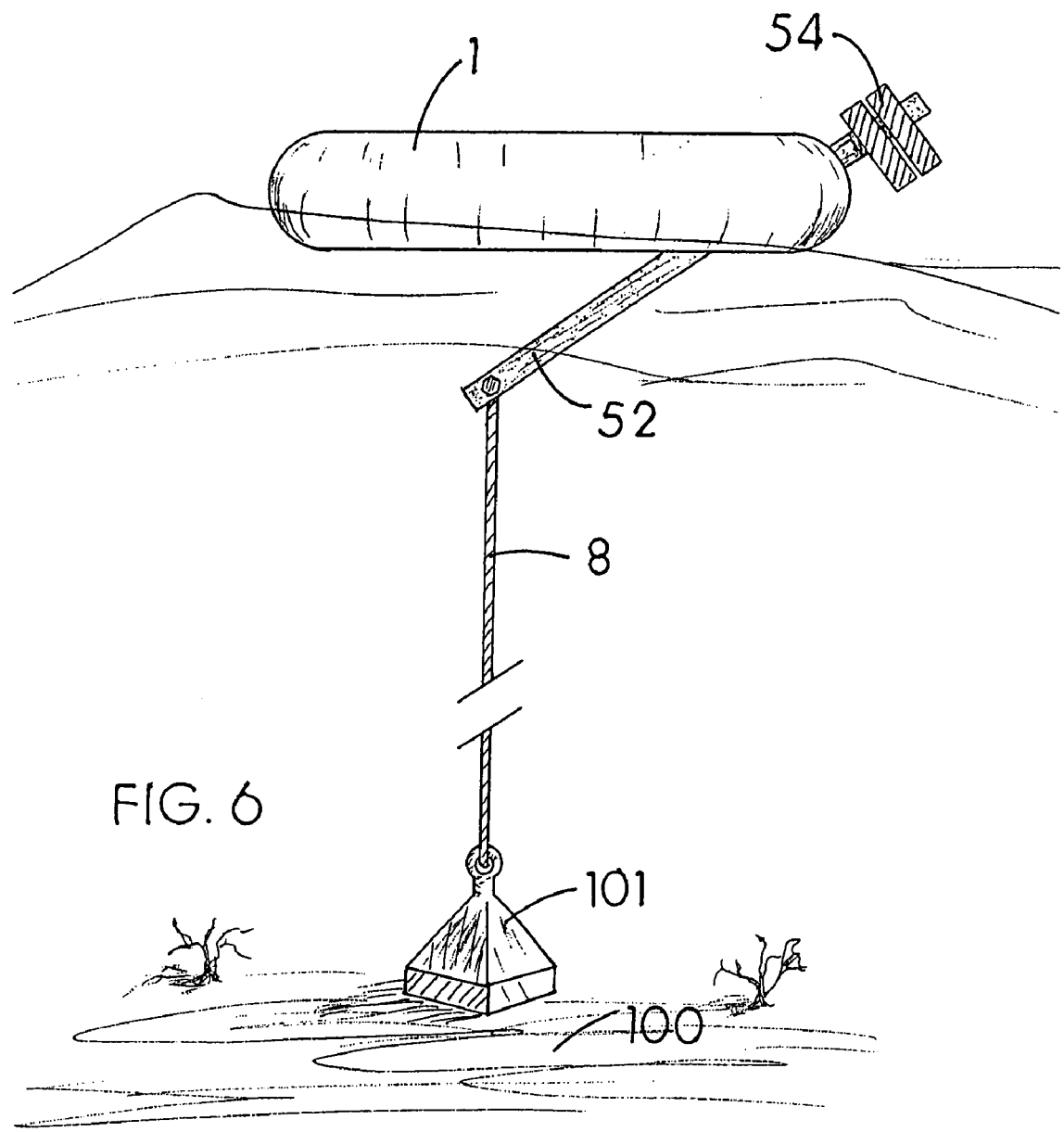
FIG. 6 illustrates the pivoting float and lever arm wherein the lever arm includes counter weights to facilitate the lever arm return to an upward or skyward orientation.

FIG. 3 illustrates the combined pivoting float 1 and lever arm 52 unfolded due to a high ocean swell with the length of the cable 8 holding the beam 11 being a fixed length. In another example (FIG. 5) the cable may be attached to the ocean floor. Also, a rod, chain or similar device may be substituted for the cable. The lever arm rotates (downward) on the shaft approximately 135°, thereby aligning the lever arm with the float (now in a vertical position). FIG. 3 illustrates this action. It will be appreciated that the pivoting float is oriented vertically to the water surface. This is a change in position from the normal horizontal orientation of the pivoting float to the ocean surface. This changed position permits all or a portion of the float to be pulled beneath the surface. When the swell passes, the pivoting float rights itself and the spring repositions the lever arm. The spring action may be assisted by counterweights attached to the lever arm. An example of these counterweights is illustrated in FIG. 6. The lever arm can return to its normal position.

FIG. 4 provides a cross sectional view of the pivoting float and lever arm assembly as indicated in FIG. 1. Illustrated is the pivoting float 1 with the lever arm 52 extending downward through the center opening of the float. Illustrated are two generators 64, 65. An example of the positioning of the gear mechanism 62, 66 for each generator (transferring energy from the moving shaft 51) are also illustrated. The lever arm pivots relative to the float on the rotating shaft. This motion, generated by wave motion, transfers or transforms the energy. The pivoting float components include the spring 61 which returns the lever arm to a predetermined position. The pivoting coupling 53 connects the lever arm and the cable 8 attached to the beam 11. The return motion of the lever arm by the springs may be assisted by counter weights.

FIG. 6 illustrates a side view of the pivoting float and the lever arm. Also illustrated are counterweights. In this example, the counterweights 54 are located at the end of the lever arm 52. Also illustrated is the lever arm attached to a cable or rod 8 attached to the ocean floor 100 by a connector or anchor 101.

One of the significant differences between the device subject of this application and other devices is that in the instant device, both the pivoting float and the lever arm rotate in orientation to the ocean surface in an unfolding method. The lever arm has a rotational motion and the float rotates from the horizontal position to a vertical position in orientation to the ocean surface. The float may be submerged in the vertical position. Prior art may have float and lever arm combinations but they have a stationary component that does not rotate. The Salter, U.S. Pat. No. 3,928,967 and Reenberg, U.S. Pat. No. 4,568,836, patents have a float that rotates but either do not have a lever arm or a lever arm that rotates. The devices depend upon an internal inertia or a stationary component. The unfolding float lever arm combination where lever arm and float both rotate in orientation to the ocean surface is one of the significant differences of the device subject of this disclosure.

The invention claimed is:

1. A lever operated pivoting float that transforms the rise and fall of ocean waves to different forms of energy comprising
    a) a pivoting float pivotally attached to a first end of a lever arm with the float in a first horizontal position on an ocean and the lever arm in a first position with a second end of the lever arm oriented upward out of the ocean and wherein the float and lever arm can both change to a vertical position and be submerged in the ocean;
    b) a spring component that returns the lever arm to its first position;
    c) a center opening of the float allowing passage of a second end of the lever arm;
    d) the second end of the lever arm is attached to a submerged stable object with a fixed length cable wherein the pivoting float and lever arm can change orientation to the submerged stable object.

2. The lever operated pivoting float of claim 1 further comprising a generator in the float that is powered by the pivoting motion of the lever arm turning a rotating shaft.

3. The lever operated pivoting float of claim 2 further comprising a ratchet and pawl to allow the generator to turn only in one direction.

4. The lever operated pivoting float of claim 2 further comprising a first generator that is powered when the rotating shaft turns clockwise and a second generator is powered when the rotating shaft turns counter clockwise.

5. The lever operated pivoting float of claim 1 wherein the orientation of the second end of the lever arm can changes at least 90 degrees from the first position and the float can change approximately 90 degrees.

6. The lever operated pivoting float of claim 1 wherein a generator is contained within the lever arm.

7. A lever operated pivoting float that transforms the rise and fall of ocean waves to different forms of energy comprising:
    a) a float comprising a first end and a second end and a rotating shaft at the first end;
    b) the float further comprising a center opening;
    c) a lever arm having a first end and a second end wherein the first end is attached to the rotating shaft and the second end can pass through the center opening; and d) a cable of fixed length passing through the center opening and attached to the second end of the lever arm and attached to an anchor or submerged stable structure.

8. The lever operated pivoting float of claim 6 wherein the float pivots between a horizontal and a vertical position at the second end of the float.

9. The method of a lever operated pivoting float transforming the rise and fall of ocean waves to different forms of energy comprising:
    a) placing on a ocean surface a float having a first end and a second end with a rotating shaft at the first end and a center opening;
    b) mounting a first end of a lever arm on the rotating shaft wherein a second end of the lever arm is higher than the first end and can pass through the center opening;
    c) attaching the second end of the lever arm to an anchor or stable submerged structure with a fixed length of cable;
    d) an ocean wave pulling the second end of the lever arm through the opening into the ocean and the lever arm rotating on the rotating shaft; and
    e) pulling the first float end beneath the ocean surface wherein the float pivots at the second end.

10. A lever operated pivoting float transforming the rise and fall of ocean waves to different forms of energy comprising:
    a) an anchor in a body of water;
    b) a cable of fixed length extending from the anchor to a water surface and passing through a center opening of a U shaped float and attaching to a cable end of a lever arm;
    c) a U shaped float having a shaft end and an opposite closed float end;
    d) a shaft at the shaft end of the U shaped float connecting ends of two sides of the float wherein the shaft is the pivot point of the float and a shaft end of the lever arm and opposite the cable end of the lever arm;
    e) the U shaped float pivoting at the closed float end by a lifting wave action wherein the fixed length of cable and the cable end of the lever arm remain at a fixed elevation and rotating and passing through the center opening of the float until the shaft end of the lever arm is elevated above the cable end of the lever arm;
    f) the lever arm being in a vertical orientation beneath the water surface wherein the lever arm and fixed length cable pull the float causing the float to pivot at its closed float end and be submerged in a vertical orientation wherein both the lever arm and the float are vertical in orientation to the ocean surface;
    g) the anchor exerting leverage force through the cable to the lever arm to the shaft at the float end of the lever arm in a first direction of rotation and in a second direction of rotation to the float;
    h) a spring on the shaft exerting force to return the float to the horizontal position and lever arm back to a position wherein the cable end is higher than the shaft end;
    i) activating the shaft to rotate gears and generator on the shaft end of the lever arm thereby transforming the rise and fall of the ocean into electricity.

* * * * *